US010555025B2

(12) United States Patent
Greenfield

(10) Patent No.: US 10,555,025 B2
(45) Date of Patent: Feb. 4, 2020

(54) AGGREGATING TIME-DELAYED SESSIONS IN A VIDEO DELIVERY SYSTEM

(75) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 1027 days.

(21) Appl. No.: 12/773,513

(22) Filed: May 4, 2010

(65) Prior Publication Data

US 2011/0276880 A1 Nov. 10, 2011

(51) Int. Cl.
*H04N 21/2747* (2011.01)

(52) U.S. Cl.
CPC .............................. *H04N 21/2747* (2013.01)

(58) Field of Classification Search
CPC ........... H04N 21/2747; H04N 21/4147; H04N 21/4325; H04N 5/783
USPC ....... 725/74, 82, 86–105, 143–153; 370/431, 370/441, 420, 464
See application file for complete search history.

(56) References Cited

U.S. PATENT DOCUMENTS

| | | | |
|---|---|---|---|
| 6,850,691 B1 | 2/2005 | Stam et al. | |
| 7,457,520 B2 | 11/2008 | Rossetti et al. | |
| 7,493,015 B1 | 2/2009 | Van Stam et al. | |
| 7,657,644 B1 * | 2/2010 | Zheng | H04L 12/1886 709/231 |
| 7,916,755 B2 * | 3/2011 | Hasek | H04N 7/17318 370/464 |
| 9,009,340 B2 * | 4/2015 | Thompson | H04L 47/10 709/231 |
| 2003/0093790 A1 * | 5/2003 | Logan | G06F 17/30265 725/38 |
| 2003/0196204 A1 * | 10/2003 | Thiagarajan | H04N 7/17318 725/61 |
| 2004/0261091 A1 * | 12/2004 | Cherkasova | H04L 29/06027 725/9 |
| 2005/0028219 A1 * | 2/2005 | Atzmon | H04N 7/17336 725/116 |
| 2006/0218602 A1 * | 9/2006 | Sherer | H04N 7/17318 725/88 |
| 2007/0101012 A1 * | 5/2007 | Li | H04L 29/06027 709/231 |

(Continued)

FOREIGN PATENT DOCUMENTS

WO WO-2010062227 A1 * 6/2010 ........... H04L 47/745

*Primary Examiner* — Mohamed A. Wasel
(74) *Attorney, Agent, or Firm* — Sterne, Kessler, Goldstein & Fox P.L.L.C.

(57) ABSTRACT

In a video network context, video sessions can be aggregated and delivered to users, and smart replay can be provided responsive to user commands. Various and different commands are received from users at different times. Video sessions (e.g., program streams) are identified and/or created based on the commands. Video sessions are multicasted to the users. Joining multiple users to a video session reduces a need to create multiple identical or similar individual sessions, thereby increasing session capacity. Delivering a video session to users likely to be seeking a particular moment of interest in a video, based on an increased tolerance of received user commands, increases the user experience by delivering the moment of interest directly, without requiring multiple commands from users attempting to navigate towards the moment of interest.

28 Claims, 8 Drawing Sheets

(56) References Cited

U.S. PATENT DOCUMENTS

| | | | |
|---|---|---|---|
| 2008/0273858 A1* | 11/2008 | Wald | G11B 27/031 386/347 |
| 2008/0301750 A1* | 12/2008 | Silfvast | H04N 7/17318 725/131 |
| 2009/0119722 A1* | 5/2009 | VerSteeg et al. | 725/87 |
| 2009/0222854 A1* | 9/2009 | Cansler | H04N 7/17318 725/35 |
| 2009/0313382 A1* | 12/2009 | Bouazizi | H04N 7/17318 709/231 |
| 2009/0320084 A1* | 12/2009 | Azam et al. | 725/120 |
| 2010/0031162 A1* | 2/2010 | Wiser | G06Q 30/0255 715/747 |
| 2010/0077435 A1* | 3/2010 | Kandekar | G11B 27/005 725/61 |
| 2010/0229234 A1* | 9/2010 | Rouse | H04L 63/0218 726/11 |
| 2010/0269142 A1* | 10/2010 | Li | H04H 20/42 725/62 |
| 2010/0290761 A1* | 11/2010 | Drake | G11B 27/005 386/350 |
| 2010/0306401 A1* | 12/2010 | Gilson | H04N 5/765 709/231 |
| 2010/0333124 A1* | 12/2010 | Folgner | H04H 60/33 725/13 |
| 2011/0296482 A1* | 12/2011 | Melsen | H04L 47/745 725/109 |

\* cited by examiner

AGGREGATING TIME-DELAYED SESSIONS IN A VIDEO DELIVERY SYSTEM

BACKGROUND

Field of the Invention

Embodiments relate generally to delivering video to users, and more particularly to aggregating multiple user requests for viewing a moment of interest within a video stream.

Background Art

The Digital Video Recorder, or DVR, has been an important innovation in television, allowing users to watch the programs they wish to watch on their own schedules. Traditionally, DVR functionality has been implemented using a specialized piece of equipment deployed at a user's home. Providers of television services, such as cable operators, endeavor to both reduce the cost and enhance the performance of DVR systems.

Conventional DVR provides a user with the ability to pause and rewind live television, for example, the ability to pause television when someone knocks on the front door, or the ability to quickly replay a portion of the program that just aired, such as an interesting play in a football game. This replay can be achieved by "rewinding" a portion of the program stored locally in real time at the DVR and then replaying it. DVR systems typically also include an "instant replay" function, whereby a single key-press rewinds by a fixed amount of time, such as 8 seconds, and then replays.

A DVR can also be implemented at the headend of a networked video system. This type of DVR is referred to herein as a network DVR system. In contrast to conventional DVR systems, which store programs locally, network DVR systems store video at the headend. In a network DVR, video can be delivered to a user as sessions. One difficult challenge faced by video delivery systems relates to so called "Super Bowl® moments," or moments of interest, in a video. In a popular live program that attracts many users, such as the Super Bowl®, a significant event may occur, such as, for example, a controversial play. The significant event causes many users to nearly-simultaneously attempt to replay the event. In this situation, many users watching a live broadcast stream suddenly request a time-delayed version of the program. In a conventional network DVR system, this sudden request by many users causes there to be generated numerous individual sessions (unicast streams) to deliver a time-delayed version of the program to each user. The unusually large number of requests may exceed the capacity of the system to simultaneously deliver individual sessions. If demand is sufficient to exceed system capacity, at least some users will not be able to replay the event. (This is equivalent to getting an all circuits busy message, when trying to make a telephone call.)

Additionally, in a conventional DVR system, manually rewinding (or fast-forwarding) can be problematic. A delay occurs between seeing the beginning of a scene that is of interest, pressing a button on the remote to begin playback, and then subsequently waiting for the command to be executed by the DVR system. In a conventional network DVR system, this problem can be exacerbated by an additional delay caused by time necessary for the user's command to be communicated to the server at the headend. Existing systems attempt to address this problem by automatically offsetting the playback point by a predicted amount. For example, while rewinding, when the network DVR system receives a command to play, it might assume that the user intended to hit play 500 milliseconds earlier, and the video delivery system will begin replay on that basis. Examples of offsetting the playback point by a predicted amount can be found in U.S. Pat. Nos. 6,850,691 and 7,493,015, for example.

What is needed, therefore, is an arrangement that enables a video delivery system, including a network DVR system, to serve user requests, without requiring excess infrastructure to provide excess session capacity only to support these infrequent significant events that attract many users interested in a moment of interest. Furthermore, what is needed is a system that can enhance the user experience by intelligently responding to user commands.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
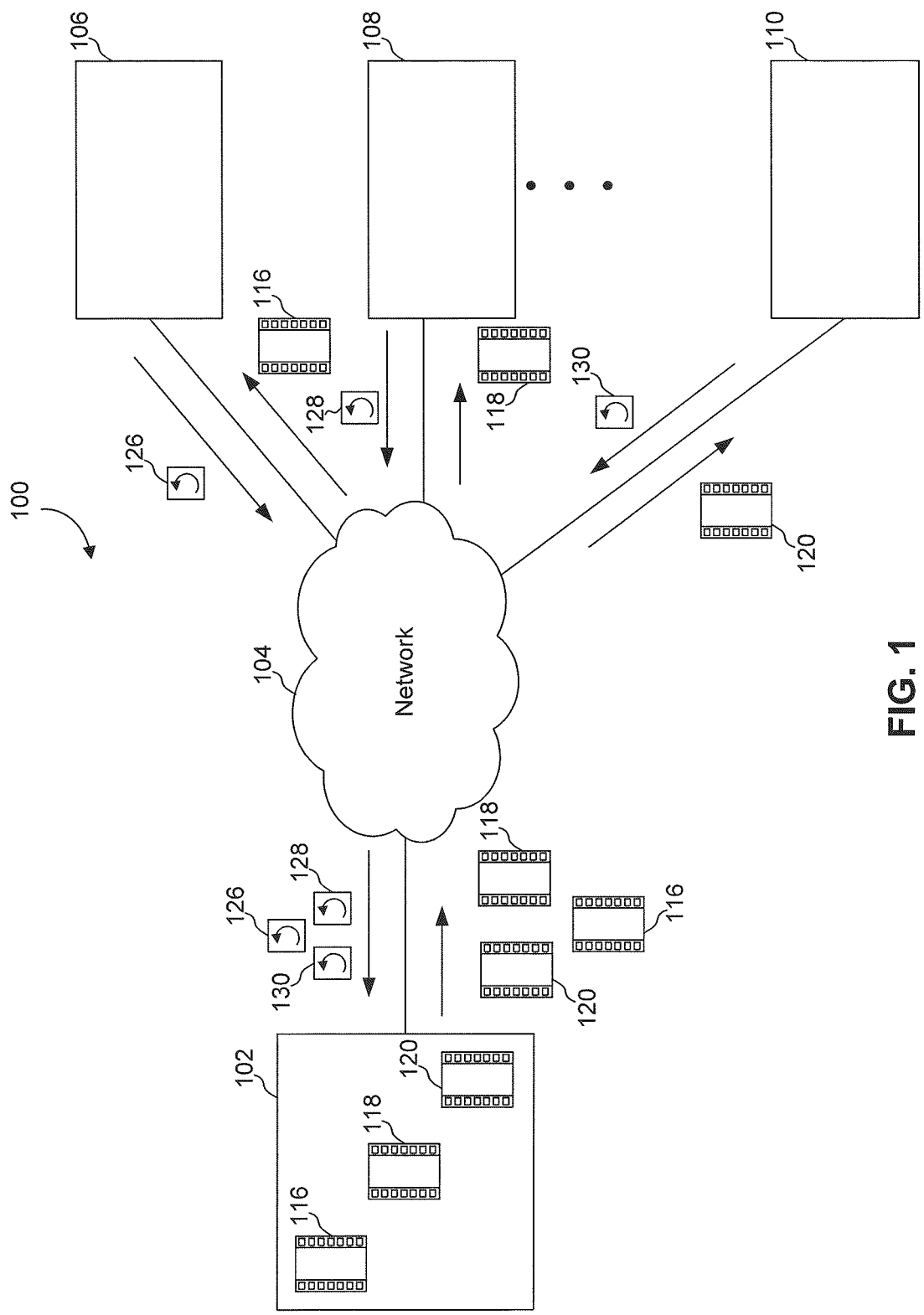
FIG. 1 is a block diagram of an architecture of a shared-storage network video delivery system.

FIG. 1 illustrates a shared-storage, headend-based, network video delivery system 100, including headend 102, network 104, and set top boxes 106, 108, 110. Although only three set top boxes 106, 108, 110 are illustrated, it is contemplated that many additional set top boxes will be used with the system 100. The set top boxes (STBs) 106, 108, 110 are coupled to a headend 102 through communication links or network 104. Exemplary STBs 106, 108, 110 include, without limitation, the Explorer™ 8300HD DVR Series, Explorer™ 4250HD, and Explorer™ 4200 available from Cisco® of San Jose, Calif. Exemplary STBs 106, 108, 110 also include, without limitation, Internet Protocol (IP)-based (i.e., IPTV) STBs. Embodiments are not limited to these exemplary STBs, and it would be apparent to those skilled in the art that other STBs can be used in embodiments described herein.

A remote control (not shown) may be used to control operation of each STB 106, 108, 110. Some STBs may have controls thereon not requiring the use of a remote control. The remote control is configured with buttons to control rewind, play, pause, stop, fast forward, etc. In an embodiment, the remote control is configured with an instant replay button that automatically rewinds video being displayed a predetermined number of seconds (e.g., 8 seconds). The instant replay button allows a user to easily rewind a portion of video including a moment of interest in a streaming video (whether the video is live or pre-recorded). A moment of interest can include one or more frames within a video stream that a viewer wants to watch again.

The headend-based system 100 includes a server (not shown) that receives media (e.g., a video stream) provided by content providers. The media is typically received via satellite or terrestrial feed in digital form. The headend-based system 100 can record a copy of a program (or multiple copies of the program), which is then used to deliver DVR functionality to many users each having a set top box 106, 108, 110. In an embodiment, a buffer is connected to the server to temporarily store a copy of the media. The temporary storage of the media allows a user to transmit commands to the headend to alter playback of the media (also known as trick mode functionality), including rewind, pause, fast forward, etc.

When a moment of interest occurs, many users typically send individual user requests 126, 128, 130 to obtain time-delayed video sessions 116, 118, 120. In a conventional video delivery system, each user would be allocated an individual unicast session. Each of the requests 126, 128, 130 can be fulfilled using a single, shared video session, if the user requests 126, 128, 130 happen to coincide and the system were modified according to embodiments described herein. However, each user request 126, 128, 130 typically directs the system 100 to initiate the replay at a slightly different time, generating unique individual sessions 116, 118, 120. The headend 102 generates sessions 116, 118, 120 and sends them out to the set top boxes 106, 108, 110 via the network 104. Generating sessions 116, 118, 120 consumes session capacity of the headend 102 and network 104.

Figure 2:
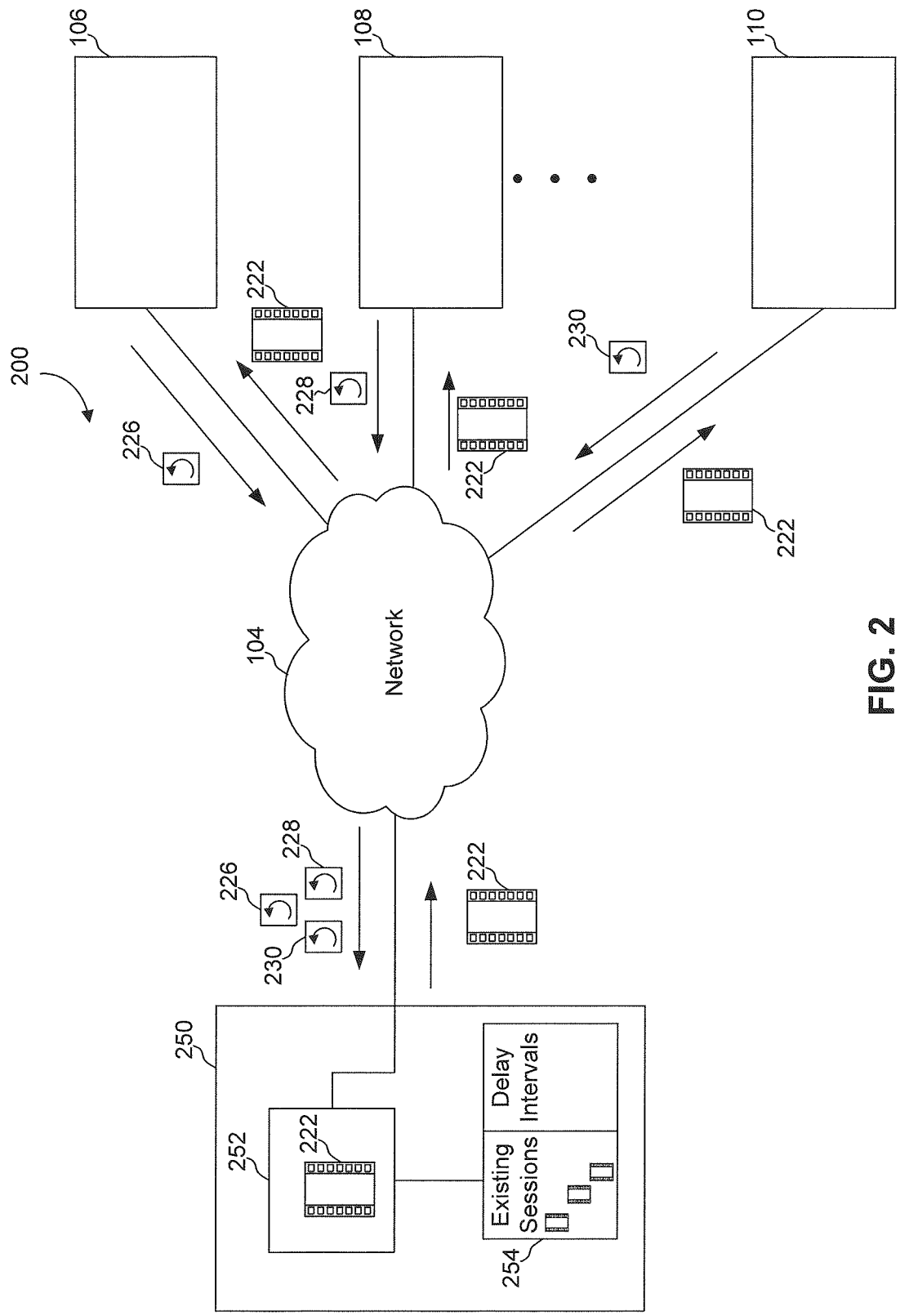
FIG. 2 is a block diagram of an architecture of an aggregating network video delivery system.

Embodiments described herein include systems and methods for aggregating time-delayed sessions in response to the occurrence of a moment of interest, so that multiple users can share a single session, in a fashion that is transparent to the user. FIG. 2 illustrates an architecture of an aggregating system 200, according to an embodiment including a headend 250 having an aggregator 252 (or controller). The aggregator 252 is configured to receive user requests 226, 228, 230 and produce a reduced number of sessions, e.g., a single session 222, in response to the user requests 226, 228, 230. The aggregator 252 can also intelligently respond to user requests 226, 228, and 230, for example, using smart replay and related functionality described herein. The aggregator 252 may be implemented in hardware and/or software.

User requests 226, 228, 230 for an instant replay (e.g., a user pressing an instant replay button on a remote) cause the video program to skip back by a nominally-fixed amount of time, typically 8 seconds, and immediately begin replaying from the now-delayed point, as delivered to and perceived by the user in the form of, e.g., a session 222. The amount of time the program is rewound varies slightly around the nominal replay interval, and can vary based on how the video is compressed. For example, the video can be rewound to a special frame of video, called an I-frame, that is close to 8 seconds earlier. Typically, if the nominal rewind interval associated with an instant replay request is 8 seconds, the video can actually be rewound from as little as 7.5 seconds, to as much as 8.5 seconds, for each instant replay request, based on typical variances including how the video is compressed and the location of I-frames.

When the system receives a large number of nearly-simultaneous (e.g., within a few seconds of each other) user requests 226, 228, 230 (such as instant replay requests) from multiple users of set top boxes 106, 108, 110, the system aggregates these requests into a single session 222 created at the headend 250. In addition to creating sessions 222, the aggregating system 200 can maintain a table of existing sessions 254 at the headend 250.

The table tracks existing sessions 254 and the delay interval associated with each of the existing sessions 254. The table enables the system 200 to easily find an existing session 254 that can be shared by many users who have requested approximately the same instant replay, without having to create additional sessions. Because the instant replay interval can vary, based on, for example, video compression schemes, and because users can tolerate variance in the intervals and are not typically counting the seconds as they watch the program, the additional variation in the replay interval will almost always be transparent to the user. Accordingly, the aggregating system 200 can sharply reduce the number of time-delayed sessions 222 required to be created, thereby increasing capacity of the system 200 with no negative impact to the user experience.

Figure 3:
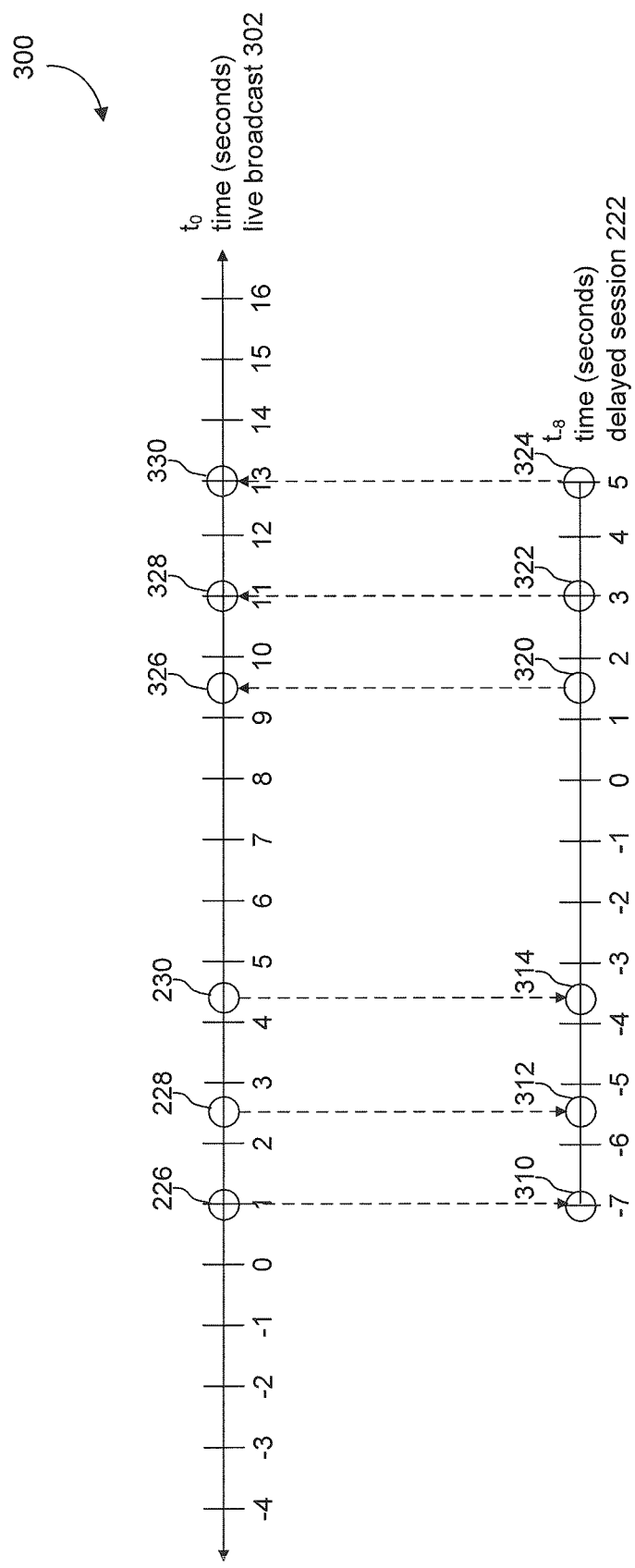
FIG. 3 is a timeline illustrating a live broadcast associated with a delayed session.

FIG. 3 is a timeline 300 of a live broadcast 302 associated with a delayed session 222. For example, the live broadcast 302 is delivered to three users who watch the live broadcast 302. A timeframe of live broadcast 302 is represented as $t_0$, used when referring to times in the timeframe of the live broadcast 302. At time $t_0=1$, a first user issues request 226. As illustrated in FIG. 3, user request 226 is an instant replay request. This causes the system to dynamically create delayed session 222, a stream providing a delayed version of the live broadcast 302, delayed by 8 seconds. The timeframe for the 8 second delay is represented as $t_{-8}$, used when referring to times in the timeframe of the delayed session 222. Thus, time $t_0=1$ associated with the first user request 226 corresponds to time $t_{-8}=-7$. The delayed session 222 is delivered to the first user starting at time $t_{-8}=-7$, located at first delayed destination 310 in delayed session 222.

At time $t_0=2.5$, a second user initiates an instant replay. The system identifies existing delayed session 222 that was dynamically created in response to the first user's instant replay command 226, and determines that the delayed session 222 is compatible with the second user request 228. In response to the second user request 228 at time $t_0=2.5$, the system then joins the second user to the delayed session 222, delivering delayed session 222 to the second user at time $t_{-8}=-5.5$ associated with second delayed destination 312. Subsequently, at time $t_0=4.5$, a third user initiates an instant replay command (third user request 230), and the system delivers delayed session 222 to the third user at time $t_{-8}=-3.5$ associated with third delayed destination 314. In this example, multiple users can naturally share the delayed session 222, because the users are each starting from the same stream (live broadcast 302), and issuing a command to skip back by the same (nominal) amount of time (8 seconds) by issuing an instant replay request, corresponding to the delayed session 222.

Delivery and playback of delayed session 222 proceeds, allowing the users to view an instant replay of the live broadcast 302 on an 8 second delay. After the users have viewed their desired portions of the delayed session 222, the users can each initiate a command to resume live play. Each user can resume live play at any time, so the order that the users resume live play does not necessarily correspond to the order in which the users originally requested instant replays. For example, commands 320, 322, and 324 are issued by first, second, and third users, respectively. At time $t_{-8}=1.5$, the first user initiates a first return to live command 320. The system then switches the first user to the live broadcast 302 at point 326 corresponding to $t_0=9.5$. At time $t_{-8}=3$, the second user initiates a second return to live command 322. The system then switches the second user to the live broadcast 302 at point 328 corresponding to $t_0=11$. At time $t_{-8}=5$, the third user initiates a third return to live command 324. The system then switches the third user to the live broadcast 302 at point 330 corresponding to $t_0=13$. Upon switching all users from the delayed session 222 to the live broadcast 302, the system can detect that no users are receiving the delayed session 222. The system can then automatically terminate the delayed session 222 to recover resources. For example, the delayed session 222 can be terminated at time $t_{-8}=5$. However, the system can maintain the delayed session 222, for example, at the table of existing sessions 254 at the headend 250 by tracking the delayed session 222 and the delay interval ($t_{-8}$ or 8 seconds) associated with the delayed session 222.

Figure 4:
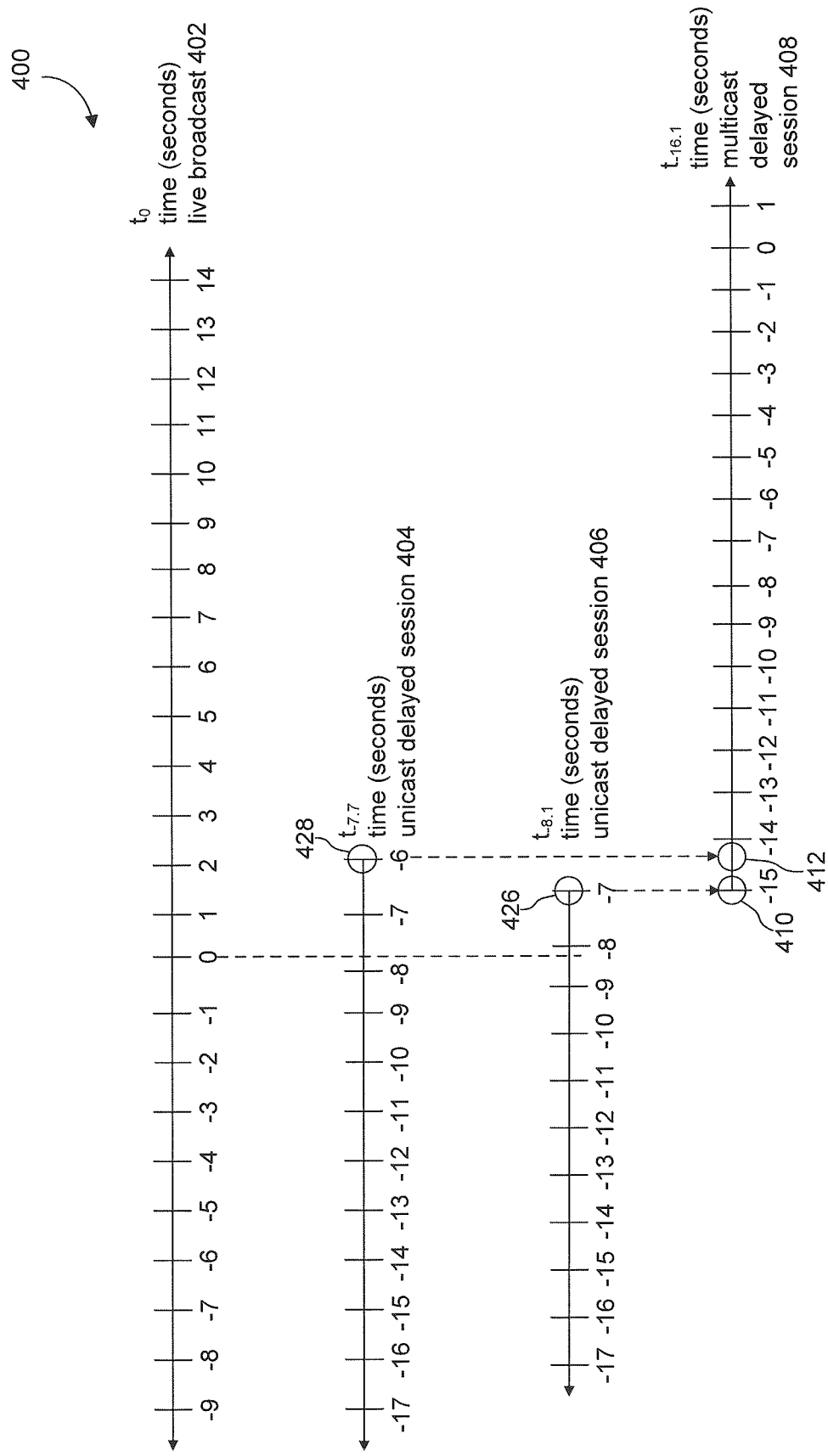
FIG. 4 is a timeline illustrating a live broadcast, unicast delayed sessions, and a multicast delayed session.

FIG. 4 is a timeline 400 illustrating a live broadcast 402 at timeframe $t_0$, unicast delayed session 404 at timeframe $t_{-7.7}$, unicast delayed session 406 at timeframe $t_{-8.1}$, and a multicast delayed session 408 at timeframe $t_{-16.1}$. Unicast delayed sessions 404 and 406 are delayed from live broadcast 402 by 7.7 and 8.1 seconds, respectively, and also are delayed relative to each other by 0.4 seconds. Unicast delayed sessions 404 and 406 represent two users watching versions of a delayed program that are also slightly delayed relative to one another. For example, unicast delayed session 404 is delayed from live by 7.7 seconds, such that time $t_0=0$ of live broadcast 402 corresponds to time $t_{-7.7}=-7.7$ of unicast delayed session 404. This correspondence is illustrated by the dotted line at $t_0=0$. Unicast delayed session 406 is delayed from live by 8.1 seconds, such that time $t_0=0$ of live broadcast 402 corresponds to time $t_{-8.1}=-8.1$ of unicast delayed session 406. Accordingly, unicast delayed session 404 is delayed 0.4 seconds relative to unicast delayed session 406.

Multiple unicast sessions can arise, for example, in response to multiple user commands to initiate individual sessions, when the system is not aggregating users onto the same session. For example, the system can detect that available system resources, corresponding to a system capacity to display multiple unicast delayed sessions, have not been exceeded. Such a condition can exist during times when the system receives infrequent user commands to initiate sessions. Furthermore, multiple unicast sessions can arise based on the location of I-frames in the compressed live broadcast 402, such that the system can cause each user to jump back to a prior I-frame, and the slight differences in time that these users requested their instant replays resulted in slight differences in the amount of delay from live broadcast, associated with their respective unicast delayed sessions 404 and 406.

The 0.4 second delay between unicast sessions can be caused by, for example, a first user initiating an instant replay to view unicast delayed session 404, and a second user initiating an instant replay to view unicast delayed session 406, at some point while viewing live broadcast 402. The user commands to initiate the instant replay were separated by 0.4 seconds, but may have initiated the delayed playback beginning at the same I-frame, which in both cases was nominally 8 seconds earlier. The system created a separate unicast delayed session for each user, whose requests during live broadcast 402 separated by 0.4 seconds resulted in the slightly varied delay times of 7.7 seconds and 8.1 seconds.

Referring to FIG. 4, at some point during delivery of unicast delayed sessions 404 and 406, for example, the system can identify that system resources are constrained. For example, the system receives more user requests for delayed sessions than it has a capacity to provide individualized delayed sessions. Accordingly, the system decides to join multiple users into one or more shared streams in response to user commands. As illustrated, the second user of unicast delayed session 406 issues an instant replay command 426 at time $t_{-8.1}=-7$ of unicast delayed session 406, to skip farther back. The system accordingly dynamically creates multicast delayed session 408, delayed 8 seconds relative to unicast delayed session 406. Accordingly, the second user leaves unicast delayed session 406 at time $t_{-8.1}=-7$, and enters the multicast delayed session 408 at first delayed destination 410, corresponding to $t_{-16.1}=-15$ in the timeframe of multicast delayed session 408.

As illustrated, because the second user issued the instant replay command 426 (at a time before the first user issued instant replay command 428), the system created multicast delayed session 408 relative to unicast delayed session 406. The multicast delayed session 408 therefore includes a further delay of 8 seconds relative to the unicast delayed session 406, in view of the user request 426 being an instant replay command associated with skipping back nominally for 8 seconds. Accordingly, because the unicast delayed session 406 was delayed relative to live broadcast 402 by 8.1 seconds, the multicast delayed session 408 is delayed relative to live broadcast 402 by an additional 8 seconds, for a total 16.1 second delay from live broadcast 402. This is represented by using the timeframe $t_{-16.1}$ associated with multicast delayed session 408.

As described above, the first user, viewing unicast delayed session 404, had issued an instant replay command 428 at time $t_{-7.7}=-6$, to skip farther back. The system recognized that unicast delayed sessions 404 and 406 are close enough in time to each other to join both users to the same multicast delayed session 408, even though the separate unicast delayed sessions 404 and 406 are delayed relative to each other, and delayed relative to live broadcast 402 by different amounts. Thus, the first user is subsequently joined to multicast delayed session 408 at time $t_{-16.1}=-14.4$. This represents the ability of the system to gather together into a single stream, users who would otherwise be slightly delayed relative to one another. As illustrated, the system has also terminated unicast delayed session 406 at time $t_{-8.1}=-7$, and has terminated unicast delayed session 404 at time $t_{-7.7}=-6$, to recover system resources.

The system can further be configured to avoid creating multicast delayed session 408, by instead converting unicast delayed session 406 into a multicast delayed session. In response to the second user's instant replay command 426 at time $t_{-8.1}=-7$, the system can simply skip back within the second user's existing unicast delayed session 406, positioning the second user at $t_{-8.1}=-15$. When the first user later issues instant replay command 428, the system can join the first user to the second user's unicast delayed session 406 at $t_{-8.1}=-14.4$. Although FIG. 4 illustrates unicast delayed sessions 404 and 406 as being terminated to recover system resources, the unicast delayed sessions 404 and 406 can be maintained. For example, where unicast delayed session 406 is converted to a multicast session as set forth above, the system can maintain unicast delayed session 406 and join the first user to the second user's unicast delayed session 406. The system can therefore avoid creating multicast delayed session 408, conserving system resources. The system can recover system resources by terminating unicast delayed session 404 when the first user is joined with the second.

In addition to the features described above, the system can include a smart replay enhancement, associated with, for example, analyzing user commands to identify a moment of interest and/or identifying a location to skip to in response to user commands.

Figure 5:
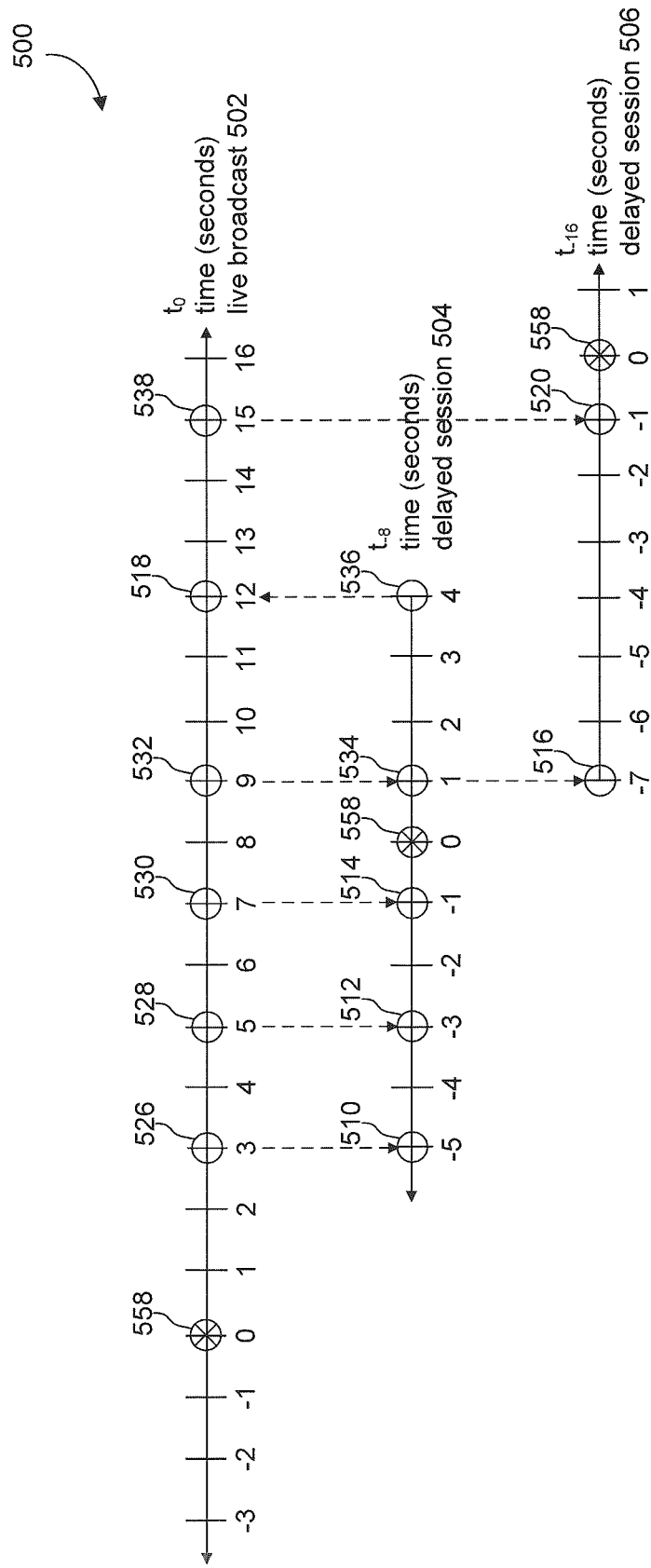
FIG. 5 is a timeline illustrating a live broadcast associated with delayed multicast sessions.

FIG. 5 is a timeline 500 illustrating a live broadcast 502 associated with delayed multicast sessions 504 and 506. The system can provide an estimate of an actual moment of interest 558, by analyzing the actions of users. For example, the system can analyze user commands 526, 528, 530, 532, and 534 from four of five total users, for example. For the sake of convenience, the actual moment of interest 558 is illustrated in each timeframe as occurring at time 0.

Commands from five users are illustrated in FIG. 5, and the commands from the first four users will be discussed first. For example, each of the first four users issues an instant replay command to skip back one time (nominally 8 seconds) to a shared, 8-second-delayed session 504. The instant replay commands 526, 528, 530, 532 are illustrated as being separated by 2 seconds each. A first user issues instant replay command 526 at $t_0=3$, and the system identifies delayed session 504 and jumps the first user to delayed session 504 at first delayed destination $t_{-8}=-5$. Although the timeline of delayed session 504 is illustrated with an arrowhead representing a pre-existing delayed session 504, the system can dynamically create a delayed session 504 responsive to the first user's command 526. A second user issues instant replay command 528 at $t_0=5$, and the system joins the second user to the delayed session 504 at second delayed destination 512 at $t_{-8}=-3$. A third user issues instant replay command 530 at $t_0=7$, and the system joins the third user to the delayed session 504 at third delayed destination 514 at $t_{-8}=-1$. A fourth user issues instant replay command 532 at $t_0=9$, and the system joins the fourth user to the delayed session 504 at $t_{-8}=1$. So far, the first three users skip back only once, and then proceed to watch the delayed program. However, the fourth user does not proceed to watch the delayed program, but instead skips back a second time, issuing instant replay command 534 at $t_{-8}=1$. The system dynamically creates delayed session 506 for the fourth user at fourth delayed destination 516 at $t_{-16}=-7$. Thus, the fourth user proceeds to watch delayed session 506, a nominally 16-second-delayed program relative to live broadcast 502. The first three users each issue a command to return to live broadcast 502 at time $t_{-8}=4$. At time $t_{-8}=4$, no additional users are joined to delayed session 504, and the system can terminate delayed session 504 to recover system resources.

The user behavior and associated commands described above with respect to FIG. 5 can enable the system to determine an estimated moment of interest as the point 514 to which the third user skipped back, i.e., the latest point to which a user skipped back and watched, without skipping back again. The third user appeared to have been satisfied that he skipped back far enough, but the fourth user does not appear to be satisfied, and skipped back a second time. Because the forth user skipped back a second time and went to time $t_{-16}=-7$, the cluster of points 510, 512, 514, 516 associated with the four users included times −5, −3, −1, and −7, respectively. In other words, the farthest-forward point of the cluster of points was −1. Accordingly, the system determines that the estimated moment of interest occurs at −1 second for each of the time references, or at time $t_0=t_{-8}=t_{-16}=-1$ second. The system determines that users can be satisfied if they are skipped back to −1 second, the estimated moment of interest, because the users will be able to view the actual moment of interest 558 that occurs at time 0.

For technical reasons associated with video encoding schemes, the estimated moment of interest can correspond to an I-frame in the video, because the I-frame is a point at which a user could actually start to view the stream. Prior users similarly can begin watching the delayed stream at an I-frame. As illustrated in FIG. 5, the first three users remaining joined to delayed session 504 issue a return to live command 536 at time $t_{-8}=4$, at which point the users return to live destination 518 at time $t_0=12$, and the system dynamically terminates delayed session 504 to conserve resources.

FIG. 5 additionally illustrates an enhancement of the smart replay, whereby users are more quickly and easily joined to sessions at an estimated moment of interest. As discussed above regarding the actions 526-536 of the first four users, the system has determined an estimated moment of interest at time −1 (for all timeframes). A fifth user watching the live broadcast 502 requests an instant replay command 538 at $t_0=15$ seconds past the moment of interest 558 at time $t_0=0$. The system can determine that the fifth user automatically should be skipped back to the 16-second-delayed stream (delayed session 506), rather than an 8-second-delayed stream (e.g., delayed session 504). The system anticipates that what the fifth user really wants, is to see the estimated moment of interest at time −1. However, skipping back only 8 seconds to the delayed session 504 would not have been enough to put the fifth user at a position where he could view the actual moment of interest 558. Thus, the fifth user is not required to issue multiple instant replay commands, and is taken directly to the estimated moment of interest at fifth delayed destination 520 at time $t_{-16}=-1$. Furthermore, the system bypassed creating, in response to the instant replay command 538, a delayed session for the fifth user that would have corresponded to delayed session 504. Thus, the system conserves resources, while improving user experience and requiring fewer input commands.

The estimated moment of interest also can be considered by the system in determining whether to terminate an existing session. For example, referring to delayed session 504, all users have departed by the time of $t_{-8}=4$. Furthermore, at time $t_{-8}=4$, five seconds have passed since the estimated moment of interest at $t_{-8}=-1$. Accordingly, the system can terminate delayed session 504 because subsequent users are less likely to want to skip back to a stream where the estimated and/or actual moment of interest has already passed.

Delayed session 506 was created at time $t_{-16}=-7$, allowing time for additional users to be joined to delayed session 506 without missing the estimated and/or actual moment of interest. For example, other users could have joined the session for approximately seven seconds after its creation, without missing the actual moment of interest. The fifth user (corresponding to instant replay command 538) was joined to the session at time $t_{-16}=-1$, six seconds after the delayed session 506 was created.

The system can create a new session, specifically starting some period of time before the estimated moment of interest, in order to allow time for additional users to be joined to the new session. For example, the system can create a new session that begins playback at time −1.5, allowing 0.5 seconds until the estimated moment of interest (and 1.5 seconds until the actual moment of interest). The estimated moment of interest has been described above as occurring 1 second prior to the actual moment of interest, based on user input from the first four users.

The smart-replay enhancements, including estimating a moment of interest, have been described with reference to, for example, a shared-storage headend-based system. The smart-replay can be applied to any DVR system (i.e., conventional in-home DVR, conventional network DVR system, etc.) or any other video system supporting trick modes (e.g., video on demand, network video delivery systems). Smart-replay even can be applied to systems not implementing shared/multicast time-delayed streams, systems not typically implementing sessions, or systems not typically implementing trick modes by initiating sessions. In an example non-shared system, DVR capability can be implemented remotely from the user, for example at the headend of a network video system configured to provide video. This type of video delivery system is referred to herein as a remote-storage DVR, or RS-DVR system. RS-DVR systems can store video remotely from the user. One such RS-DVR is described in U.S. patent application Ser. No. 12/055,795 ("the '795 application"), filed on Mar. 26, 2008, which is entitled "Digital Video Recording with Remote Storage." The '795 application is incorporated by reference in its entirety. Such systems implementing smart-replay can aggregate and analyze the commands issued by multiple users, and smart-replay can be implemented to provide an improved customer experience regardless of whether network efficiency gains are realized. For example, such systems can estimate the moment of interest based on multiple users, and take action to skip back a subsequent user by an appropriate amount within the user's own stream/playback session. Accordingly, smart-replay enhancements can be implemented regardless of whether the specialized session management described previously is implemented.

Figure 6:
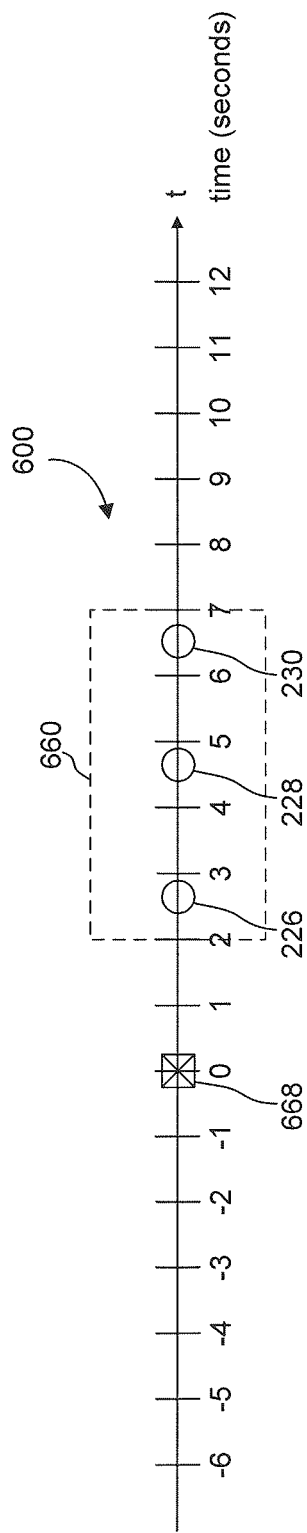
FIG. 6 is a timeline illustrating aggregated user requests.

FIG. 6 illustrates selection of users to be aggregated. In contrast to FIGS. 3-5, FIG. 6 is illustrated using a single timeline 600. The system has already identified an estimated moment of interest 668 based on the actions of other users. Accordingly, the system can designate a window 660 within which replay user requests 226, 228, 230 can be aggregated into a single session. As illustrated in FIG. 6, the window 660 spans from 2 to 7 seconds after the estimated moment of interest 668, although the beginning and end of the window can be adjusted. For example, for user requests issued at or just after t=2, the system can expect that the user is, in fact, seeking to replay the estimated moment of interest 668 at t=0. The end of the window at t=7 might be chosen in view of the amount of time skipped back by an instant replay request, e.g., eight seconds. For example, skipping back eight seconds from t=7 to t=−1 can ensure that the user's display device is able to acquire the delayed session in time to display the estimated moment of interest 668 at t=0. The duration, beginning, and end of the window 660 can be adjusted by the system according to user behavior, preferences, system load, user demand, and/or settings applied to the system, including periods of increased system constraints. For example, the designated beginning and end of window 660 can be adjusted to encompass more users to be aggregated into a given session, reducing the number of sessions required.

Aggregation can enable users to skip back to an estimated moment of interest (prior to the actual moment of interest) in one step, in response to an instant replay command, for example. Additionally, when the system is severely constrained, the system can deliver sessions approximating the results of commands otherwise associated with arbitrary trick modes that need unicast sessions (e.g., rewind). For example, the system can automatically interpret requests as instant replay requests. Embodiments can recognize commands from standard motion controls, e.g., the buttons on a remote control, normally used for standard unicast session control. The system can integrate with the standard motion controls, by interpreting the standard motion controls and using them for creating and/or jumping between multicast sessions. For example, the system can create and/or jump between multicast sessions where appropriate to aggregate users in response to standard commands including rewinding, skipping-back, fast-forwarding, skipping-ahead, pausing, and initiating playback. Accordingly, a user can be skipped-back from the current session to a time-delayed session, in response to a rewind command, when the system is so resource-constrained that it cannot accommodate normal unicast trick mode sessions. This enables the system to satisfy user requests by providing a session that includes a moment of interest, without overburdening the system or requiring the user to scan through the video using rewind.

Trick mode commands can include commands used for initiating or terminating fast forward, rewind, skip-back, instant replay, skip-ahead, or pause commands. For example, a play command is not typically referred to as a trick mode command. However, a play command can be used to terminate another command, such as the commands described herein. Thus, a play command can cause joinder to an aggregated session when used to terminate what is conventionally referred to as a trick mode (e.g., issuing a play command to terminate a rewind command). Additionally, although skip-back and instant replay commands have been listed separately, such commands can refer to equivalent functions.

Embodiments can support dynamically allocated multicast sessions, and dynamically varying delays for multicast sessions, as illustrated, for example, in FIGS. 3-5. Dynamic allocation can include dynamic creation and termination, based on, for example, actual user demand for a particular delayed session as indicated by user commands. Accordingly, embodiments have the flexibility of not requiring the creation of static pre-determined sessions, although embodiments can use static sessions, including static pre-determined sessions. If user demand is high for a particular point in time of the video, the system can dynamically create a session and aggregate users into that session, satisfying user demand without having to create multiple individual sessions for each of the users.

Additionally, the amount of time delay associated with created sessions can be dynamically varied, such that the system can respond to user demand by tailoring the time delay of a session and varying the amount of time difference between sessions. Dynamically varying time delays for multicast sessions improves user experience and enables users to be taken directly to a session tailored to include just the right amount of skipping-back, for example, without requiring multiple user commands or multiple jumps through various sessions to arrive at the resulting point. Additionally, the system can respond to high demand very quickly, creating a session timed to satisfy the demand by providing a session immediately, including the moment of interest, without causing users to generate additional commands in seeking out the moment of interest.

When a moment of interest occurs corresponding to an event, and multiple users initiate a replay in response to the moment of interest, the beginning of the event can be determined by analyzing user requests. Consider a typical 8-second instant replay function. A moment of interest occurs, and, for example, 6 seconds after the moment of interest a user may hit the instant replay button once to initiate a replay and skip back 8 seconds, to receive a session to view a time-delayed program including playback of 2 seconds of video prior to the moment of interest of the event. If, however, the moment of interest began 12 seconds earlier, then a user will typically hit the instant replay button twice to skip back 16 seconds, thereby including 4 seconds of video prior to the moment of interest. As time passes after the moment of interest, new users initiating instant replay will hit the instant replay button an appropriate number of times to skip back to the beginning of the event, or just before the beginning of the event. Accordingly, the user behaviors and type of requests, as well as the resulting points at which playback is resumed corresponding to the requests, can be analyzed to determine an estimated moment of interest.

Figure 7:
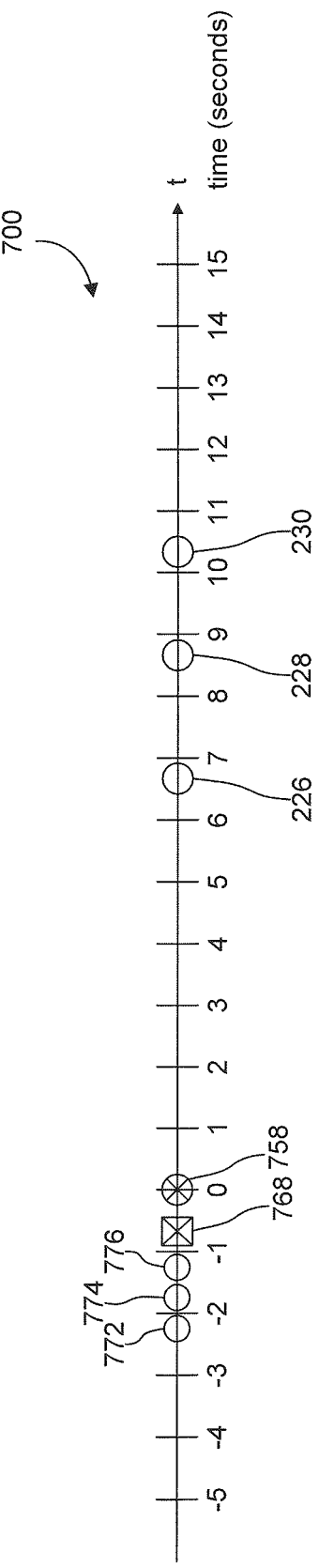
FIG. 7 is a timeline illustrating an estimated moment of interest.

FIG. 7 illustrates a timeline 700 with an estimated moment of interest 768. Behavior associated with the user requests 226, 228, 230, occurring at multiple different times following the moment of interest 758, can be analyzed to indicate the moment of interest 758. A statistical distribution of resulting points 772, 774, 776 can be expected at times to which users have rewound, skipped back, and/or resumed playback. The resulting points 772, 774, 776 may be related to the initiation of the user requests 226, 228, 230 by a generally predictable offset, for example in the situation where user requests 226, 228, 230 are instant replay requests that skip back approximately 8 seconds. However, resulting points 772, 774, 776 also may be the result of a combination of user motion control commands, including manually rewinding, manually initiating playback after fast forwarding and/or rewinding, manually pausing or initiating playback, or other user commands. Accordingly, analysis of the distribution of resulting points 772, 774, 776 can differ from the analysis of the distribution of user requests 226, 228, 230. For the sake of simplicity, three points are illustrated to represent the user requests 226, 228, 230, and three points are illustrated to represent the resulting points 772, 774, 776. However, in practice, many such points are contemplated according to, for example, the number of users and the popularity of the event corresponding to the moment of interest.

Using the distribution of resulting points 772, 774, 776, an appropriate point in time can be identified, at or just before the beginning of the event's moment of interest 758, as the estimated moment of interest 768 to which users are estimated to be seeking. For example, the mean of the resulting points 772, 774, 776 may be an effective place to start a session for the estimated moment of interest 768. Or, a fixed number of standard deviations later than the mean may be the most effective start point for the estimated moment of interest 768. Various additional statistical analyses, including models and inferential statistics, can be used in connection with analyzing the user behavior and determining the estimated moment of interest 768. The estimated moment of interest 768 can also coincide with the moment of interest 758. Alternatively, the resulting points 772, 774, 776 can be analyzed to determine if one of the resulting points 772, 774, 776 is to represent the estimated moment of interest 768. For example, one of the resulting points 772, 774, 776 farthest forward in time can be used to represent the estimated moment of interest 768. The estimated moment of interest 768 can be calculated as the latest point to which a user skipped back and proceeded to watch, without skipping back again. The system can keep track of the estimated moment of interest, to determine when to stop joining new users to the session (i.e., after the estimated moment of interest has passed).

A session can then be created, in association with the estimated moment of interest 768. The session can be started, for example, at a few seconds before the estimated moment of interest 768. This provides the system with an opportunity to join subsequent users to the session prior to the passing of the estimated moment of interest 768.

Once the point in time associated with the moment of interest in the video that users are seeking has been identified from this analysis of initial behaviors and/or resulting points, subsequent users hitting the "instant replay" button can be provided with the smart replay function where users are provided a session that they perceive as automatically skipping back to point in time corresponding to the estimated moment of interest 768, or a time slightly before the estimated moment of interest 768. The smart replay function would likely enhance the user's perceived experience, because replaying the event of interest would require only a single key press, rather than multiple key presses. Furthermore, the approach enhances the ability of the system to aggregate users into sessions, because the single-step smart replay requires users to change sessions only once to arrive at the desired location in the video. Thus, it is further possible to avoid a need to create additional sessions. The system can keep track of sessions associated with moments of interest. For example, as illustrated in FIG. 2, the system can include a table of existing sessions 254 and their associated delay intervals, for use in aggregating multiple users into an appropriate existing session 254.

In an embodiment, the smart replay function can be available in response to the first key press of a user that is analyzed to be a likely candidate for the smart replay (e.g., the user has requested an instant replay or manual rewind at a point in time falling within the window 660 (see FIG. 6), resulting in a session including the estimated moment of interest). Subsequent key presses can then produce results normally associated with the key presses. It is contemplated that the system can estimate multiple moments of interest, and analyze multiple windows within which user behavior is interpreted as requesting a smart replay or other aggregation into multiple existing sessions associated with corresponding moments of interest.

Intelligent anticipation of viewer behavior can be applied to all user requests, including requests associated with manual rewind, requesting an instant replay, skipping-back, fast-forwarding, skipping-ahead, pausing, initiating playback, and other user requests. The system can analyze the resulting points associated with user requests, to identify a moment of interest to users.

In a video delivery system with smart replay functionality, the moment of interest to users can be identified, and whenever a user stops rewinding, fast-forwarding, etc., and initiates playback near that moment, playback at the identified moment of interest can automatically begin, instead of the actual point in time at which the user initiates playback. The viewer can thereby be advanced directly to the point of interest, without having to precisely control the point at which playback is initiated. Smart replay also enables the system to effectively aggregate many manual rewind requests into shared timed-delayed sessions.

Figure 8:
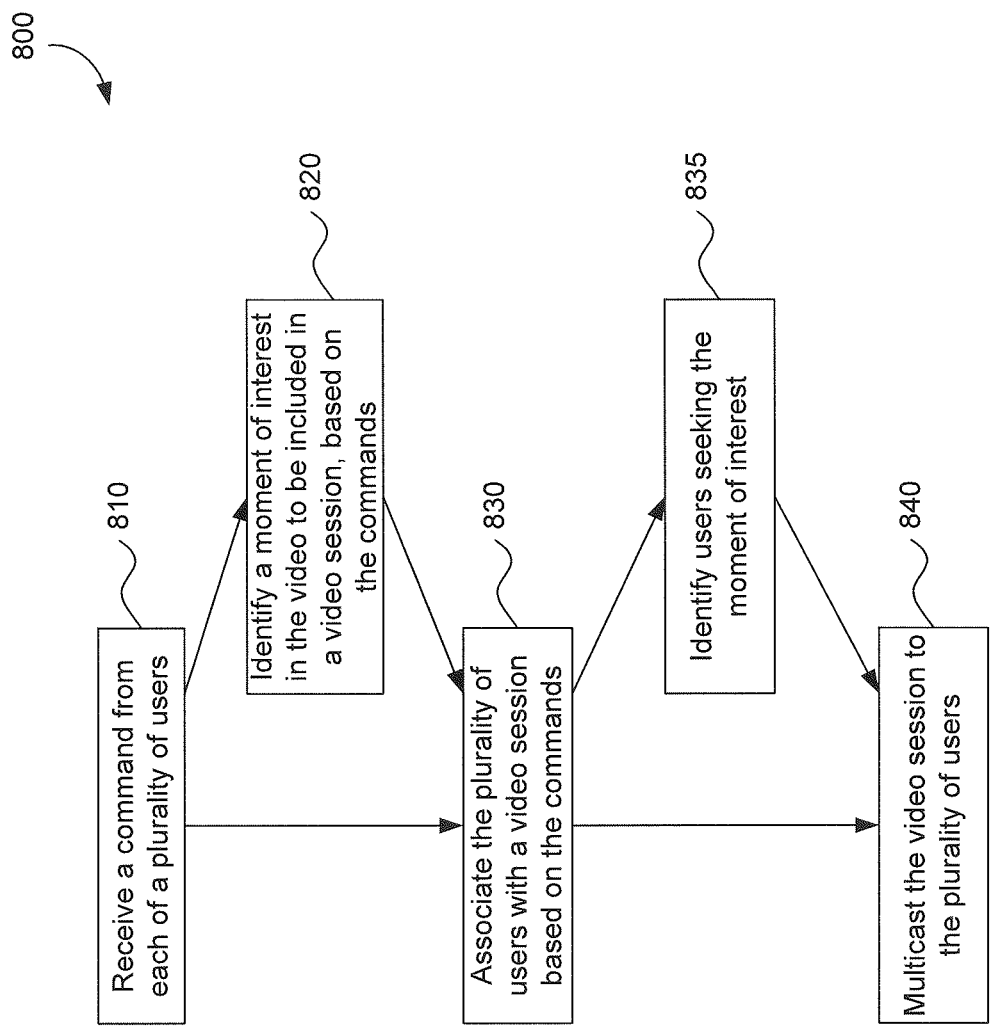
FIG. 8 is an example flow chart of a method to aggregate multiple users according to an embodiment.

FIG. 8 illustrates an example flow chart 800 of a method for aggregating video sessions according to an embodiment. Note that some steps in flow chart 800 are optional and/or do not necessarily have to occur in the order shown.

In step 810, the system receives a command from each of a plurality of users. In optional step 820, the system identifies a moment of interest in the video to be included in a video session, based on the commands. For example, step 820 can involve determining and analyzing a distribution of user requests associated with points in the video. In step 830, the system associates the plurality of users with a video session based on the commands. For example, step 830 can involve creating a video session, or identifying a preexisting video session. The video session can include the moment of interest. In optional step 835, the system identifies users seeking the moment of interest. For example, the system can identify users whose behavior occurs within a time period following the moment of interest, whose behavior indicates a point within a range of the moment of interest, or whose behavior will result in advancing playback towards the moment of interest. In step 840, the system multicasts the video session to the plurality of users. Accordingly, the users will perceive playback of the video, without the system needing to create individual video sessions for each user, thereby enhancing user experience without constraining the system.

Embodiments of the system can be used to alleviate and/or avoid system congestion while enhancing the user experience. In cases where available sessions are sharply constrained (or where the system anticipates a resource constraint), manual rewind could be temporarily disabled, and pressing the rewind button could, instead, behave as an instant replay or smart replay function. The rewind button in such circumstances can cause the system to immediately join a user to an existing time-delayed session, thereby increasing the tolerance of commands interpreted by the system during periods of increased system constraints. Similar increased tolerance can apply to other standard motion controls. In a system implementing smart replay, the specific time-delayed session to be joined may be selected so that the estimated moment of interest has not yet occurred.

The techniques described herein, including analysis of, and intelligent anticipation of, user behavior, can be applied to fast forward and skip-ahead functions. Multiple different users typically will engage in similar behaviors following a rewind or instant replay request, as they subsequently advance time to catch back up with the program, after completing replay viewing. These users might jump back to the live broadcast, but they might also advance to a particular point in time, such as the beginning of the next play, the return to program after a commercial break, or other possible additional moments of interest following the replay viewing. Intelligent anticipation of user behavior can be used to enhance the fast forward and skip-ahead functions in order to aggregate many users into shared, time-delayed sessions, and to enhance the user experience in reaching the desired location within the program delivered to the user.

Figure 9:
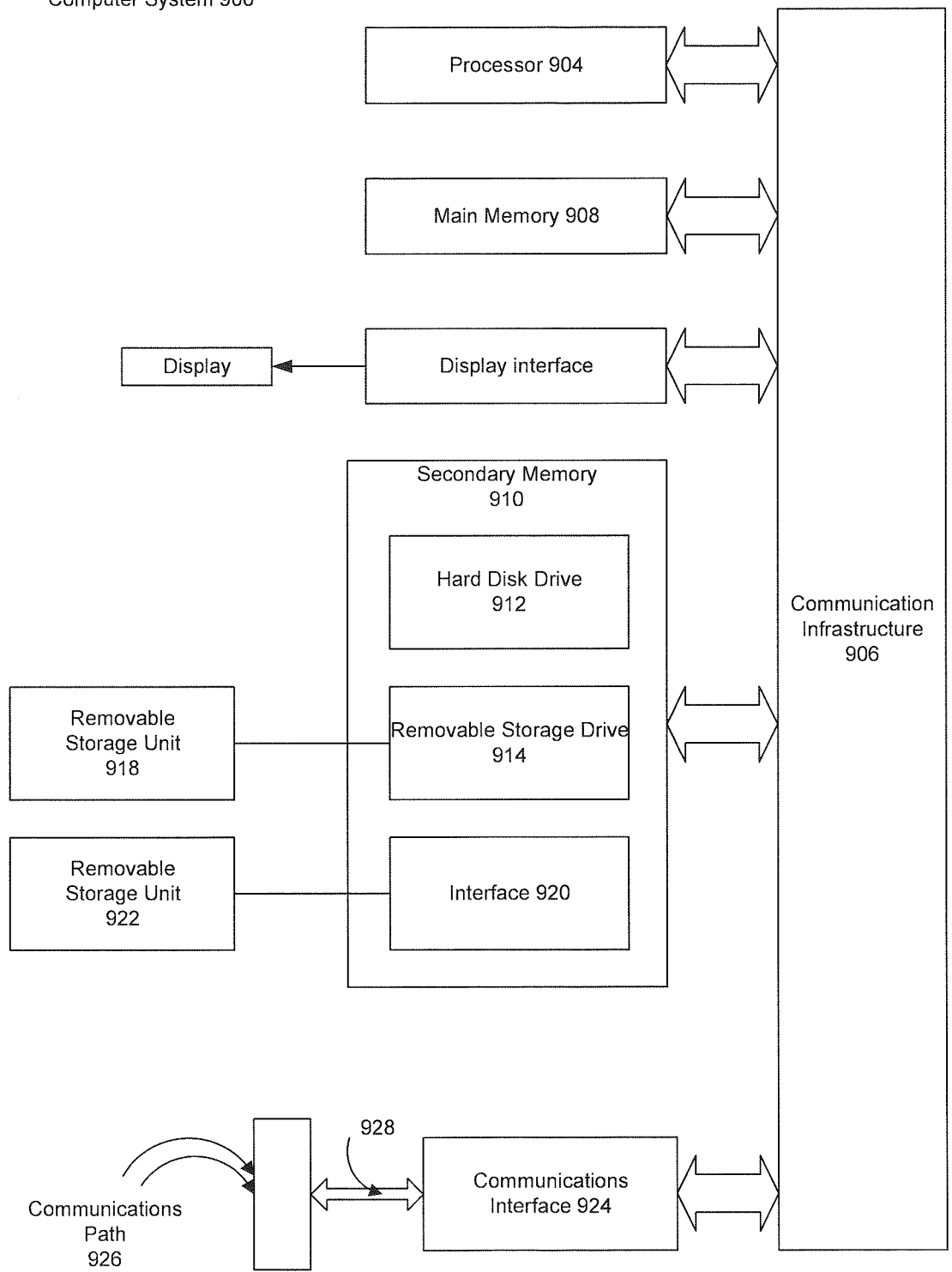
FIG. 9 is a block diagram of an exemplary computer system on which embodiments can be implemented.

FIG. 9 is a schematic diagram of an example computer system 900. Various aspects of the various embodiments can be implemented by software, firmware, hardware, or a combination thereof. FIG. 9 illustrates an example computer system 900 in which an embodiment, or portions thereof, can be implemented as computer-readable code. Various embodiments are described in terms of this example computer system 900. After reading this description, it will become apparent to a person skilled in the relevant art how to implement embodiments using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a tangible computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (e.g., an Ethernet card), a communications port, a PCMCIA slot and card, or the like. Software and data transferred via communications interface 924 are in the form of signals 928 which may be electronic, electromagnetic, optical, or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, a hard disk installed in hard disk drive 912, and signals 928. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement embodiments as discussed herein, such as the aggregating system described above. In particular, the computer programs, when executed, enable processor 904 to implement the processes of embodiments. Accordingly, such computer programs represent controllers of the computer system 900. Where embodiments are implemented using software, the software may be stored in a computer program product and loaded into computer system 900 using removable storage drive 914, interface 920, hard drive 912 or communications interface 924.

Described above are systems, apparatuses, and methods for intelligently delivering video to viewers, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for aggregating video sessions in a network video system configured to deliver video to users, comprising:

receiving, by at least one processor, a first plurality of trick mode commands from a first plurality of users;

determining, by the at least one processor, a plurality of resulting points, each resulting point from among the plurality of resulting points corresponding to one of the first plurality of trick mode commands;

determining, by the at least one processor, an estimate of an actual moment of interest of a first video session, corresponding to a first time shifted representation of the video, based upon a statistical analysis of the plurality of resulting points;

joining, by the at least one processor, the first plurality of users to the first video session before or at the estimate of the actual moment of interest;

detecting, by the at least one processor, resources available to the network video system to provide a second video session corresponding to a second time shifted representation of the video;

joining, by the at least one processor, a second plurality of users corresponding to a second plurality of trick mode commands to the second video session before or at the estimate of the actual moment of interest whose trick mode commands indicate resulting points before or at the estimate of the actual moment of interest when the resources available are sufficient to provide the second video session;

disabling, by the at least one processor, the second plurality of trick mode commands and reassigning the disabled second plurality of trick mode commands to behave as the first plurality of trick mode commands when the resources available are insufficient to provide the second video session;

joining, by the at least one processor, the second plurality of users to the first video session in response to receiving the reassigned second plurality of trick mode commands when the resources available are insufficient to provide the second video session; and terminating, by the at least one processor, the first video session and the second video session when the first plurality of users have departed the first video session before termination of the video and the second plurality of users have departed the first video session or the second video session before termination of the video, respectively.

2. The method of claim 1, further comprising dynamically creating the second video session in response to receiving the second plurality of trick mode commands when the resources available are sufficient to provide the second video session.

3. The method of claim 1, further comprising identifying a statically pre-created video session as the second video session in response to the receiving the second plurality of trick mode commands when the resources available are sufficient to provide the second video session.

4. The method of claim 1, wherein the first plurality of trick mode commands comprises initiating or terminating one of: fast forward, rewind, skip-back, instant replay, skip-ahead, or pause.

5. The method of claim 1, wherein the determining the estimate of the actual moment of interest of the first video session comprises:

determining the estimate of the actual moment of interest based on a farthest forward in time point of the plurality of resulting points.

6. The method of claim 1, wherein the joining the second plurality of users to the second video session comprises:

joining the second plurality of users to the second video session whose trick mode commands occur within a range of time following the estimate of the actual moment of interest.

7. The method of claim 1, wherein the joining the second plurality of users to the second video session comprises:

joining the second plurality of users to the second video session whose trick mode commands indicate a direction towards the estimate of the actual moment of interest.

8. The method of claim 1, wherein the terminating comprises dynamically terminating the first video session.

9. The method of claim 1, wherein the statistical analysis comprises:

a mean of the plurality of resulting points; or a fixed number of standard deviations from the mean of the plurality of resulting points.

10. The method of claim 1, wherein the resources comprise:

a system capacity to provide the second video session.

11. A network video system configured to deliver media to users, comprising:
   a memory, including a buffer, configured to store the media; and
   a processor configured to:
      receive a first plurality of trick mode commands from a first plurality of users;
      determine a plurality of resulting points, each resulting point from among the plurality of resulting points corresponding to one of the first plurality of trick mode commands,
      determine an estimate of an actual moment of interest of a first video session, corresponding to a first time shifted representation of a video, based upon a statistical analysis of the plurality of resulting points;
      join the first plurality of users to the first video session before or at the estimate of the actual moment of interest;
      detect resources available to the network video system to provide a second video session corresponding to a second time shifted representation of the video;
      join a second plurality of users to the second video session before or at the estimate of the actual moment of interest whose trick mode commands indicate resulting points before or at the estimate of the actual moment of interest when the resources available are sufficient to provide the second video session;
      disable the second plurality of trick mode commands when the resources available are insufficient to provide the second video session;
      reassign the disabled second plurality of trick mode commands to behave as the first plurality of trick mode commands when the resources available are insufficient to provide the second video session;
      join the second plurality of users to the first video session in response to receiving the reassigned second plurality of trick mode commands when the resources available are insufficient to provide the second video session; and
      terminate the first video session and the second video session when the first plurality of users have departed the first video session before termination of the video and the second plurality of users have departed the first video session or the second video session before termination of the video, respectively.

12. The system of claim 11, wherein the processor is further configured to dynamically create the second video session in response to receiving the second plurality of trick mode commands when the resources available are sufficient to provide the second video session.

13. The system of claim 11, wherein the processor is further configured to identify a statically pre-created video session as the second video session in response to receiving the second plurality of trick mode commands when the resources available are sufficient to provide the second video session.

14. The system of claim 11, wherein the first plurality of trick mode commands comprises initiating or terminating one of: fast forward, rewind, skip-back, instant replay, skip-ahead, or pause.

15. The system of claim 11, wherein the processor is configured to determine the estimate of the actual moment of interest based on a farthest forward in time point of the plurality of resulting points.

16. The system of claim 11, wherein the processor is configured to join the second plurality of users to the second video session whose trick mode commands occur within a range of time following the estimate of the actual moment of interest when the resources available are sufficient to provide the second video session.

17. The system of claim 11, wherein the processor is configured to join the second plurality of users to the second video session whose trick mode commands indicate a resulting point from among the plurality of resulting points within a range of time surrounding the estimate of the actual moment of interest when the resources available are sufficient to provide the second video session.

18. The system of claim 11, wherein the processor is configured to join the second plurality of users to the second video session whose trick mode commands indicate a direction towards the estimate of the actual moment of interest when the resources available are sufficient to provide the second video session.

19. The system of claim 11, wherein the processor is configured to dynamically terminate the first video session.

20. The system of claim 11, wherein the statistical analysis comprises:
   a mean of the plurality of resulting points; or
   a fixed number of standard deviations from the mean of the plurality of resulting points.

21. The system of claim 11, wherein the resources comprise:
   a system capacity to provide the second video session.

22. A method for smart replay of a video in a video system, the method comprising:
   receiving, by at least one processor, a first plurality of trick mode commands from a first plurality of users;
   determining, by the at least one processor, a plurality of resulting points, each resulting point from among the plurality of resulting points corresponding to one of the first plurality of trick mode commands;
   determining, by the at least one processor, an estimate of an actual moment of interest of a first video session, corresponding to a first time shifted representation of the video, based upon a statistical analysis of the plurality of resulting points;
   automatically adjusting, by the at least one processor, the video to a point proximate to the estimate of the actual moment to provide the first video session;
   joining, by the at least one processor, the first plurality of users to the first video session;
   detecting, by the at least one processor, resources available to the network video system to provide a second video session corresponding to a second time shifted representation of the video;
   joining, by the at least one processor, a second plurality of users corresponding to a second plurality of trick mode commands to the second video session before or at the estimate of the actual moment of interest whose trick mode commands indicate resulting points before or at the estimate of the actual moment of interest when the resources available are sufficient to provide the second video session;
   disabling, by the at least one processor, the second plurality of trick mode commands and reassigning the disabled second plurality of trick mode commands to behave as the first plurality of trick mode commands when the resources available are insufficient to provide the second video session;
   joining, by the at least one processor, the second plurality of users to the first video session in response to receiving the reassigned second plurality of trick mode commands when the resources available are insufficient to provide the second video session; and terminating, by the at least one processor, the first video session and the second video session when the first plurality of users have departed the first video session before termination of the video and the second plurality of users have departed the first video session or the second video session before termination of the video, respectively.

23. The method of claim 22, wherein the joining the second plurality of users to the second video session comprises:

joining the second plurality of users to the second video session whose trick mode commands indicate a resulting point from among the plurality of resulting points within a range of time surrounding the estimate of the actual moment of interest.

24. The method of claim 22, wherein the joining second plurality of users to the second video session comprises:

joining the second plurality of users to the second video session whose trick mode commands indicate a direction towards the estimate of the actual moment of interest.

25. The method of claim 22, wherein the receiving the first plurality of trick mode commands comprises:

receiving the first plurality of trick mode commands from the first plurality of users concurrently viewing a live broadcast.

26. The method of claim 22, wherein the receiving the first plurality of trick mode commands comprises:

receiving the first plurality of trick mode commands from the first plurality of users sharing the first video session.

27. The method of claim 22, wherein the statistical analysis comprises:

a mean of the plurality of resulting points; or a fixed number of standard deviations from the mean of the plurality of resulting points.

28. The method of claim 22, wherein the resources comprise:

a system capacity to provide the second video session.

* * * * *